Dec. 25, 1928.
W. LENERT
1,696,493
AIRPLANE
Filed March 27, 1926   4 Sheets-Sheet 1
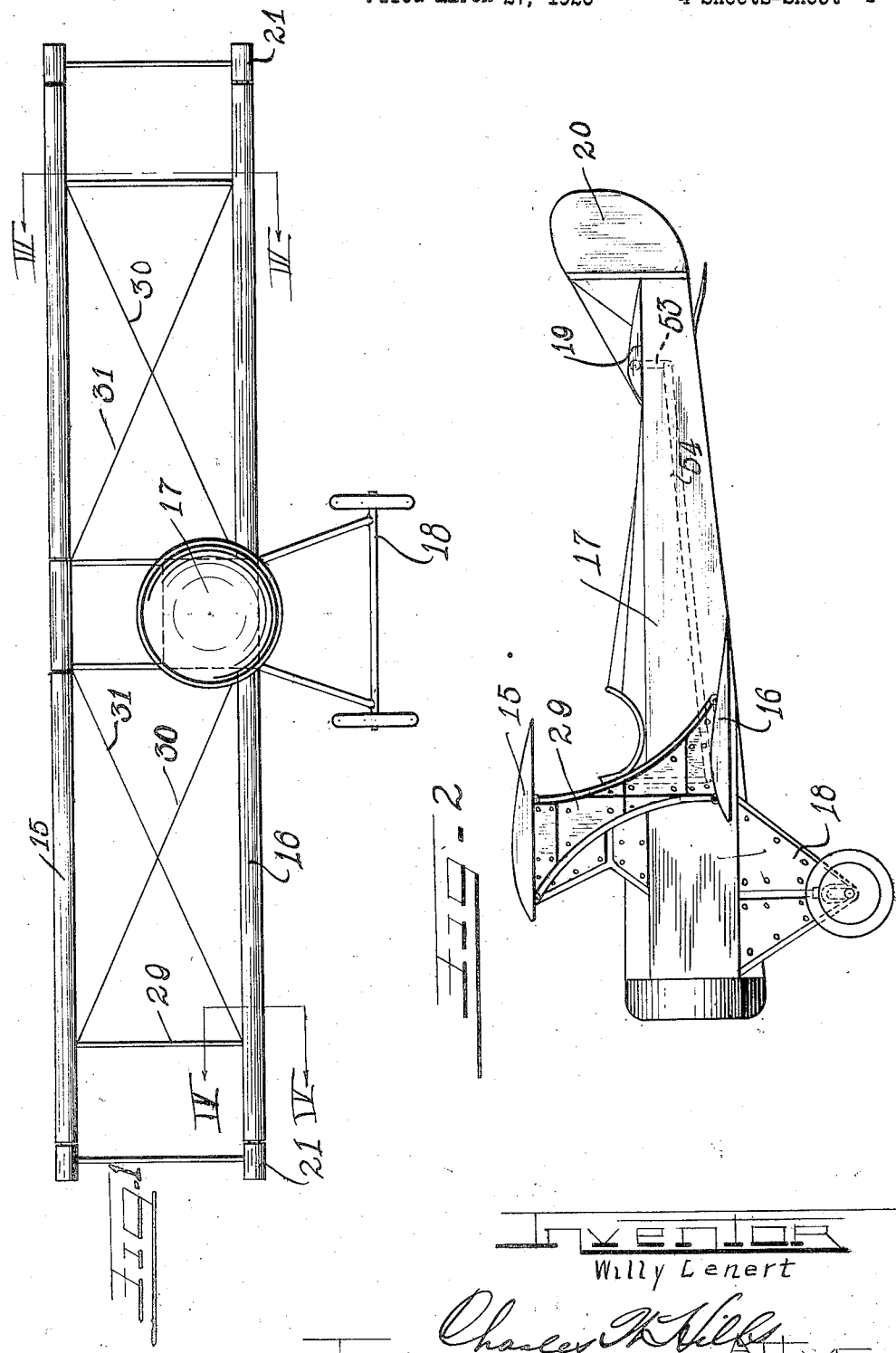
INVENTOR
Willy Lenert
BY Charles K. Wild
ATTYS

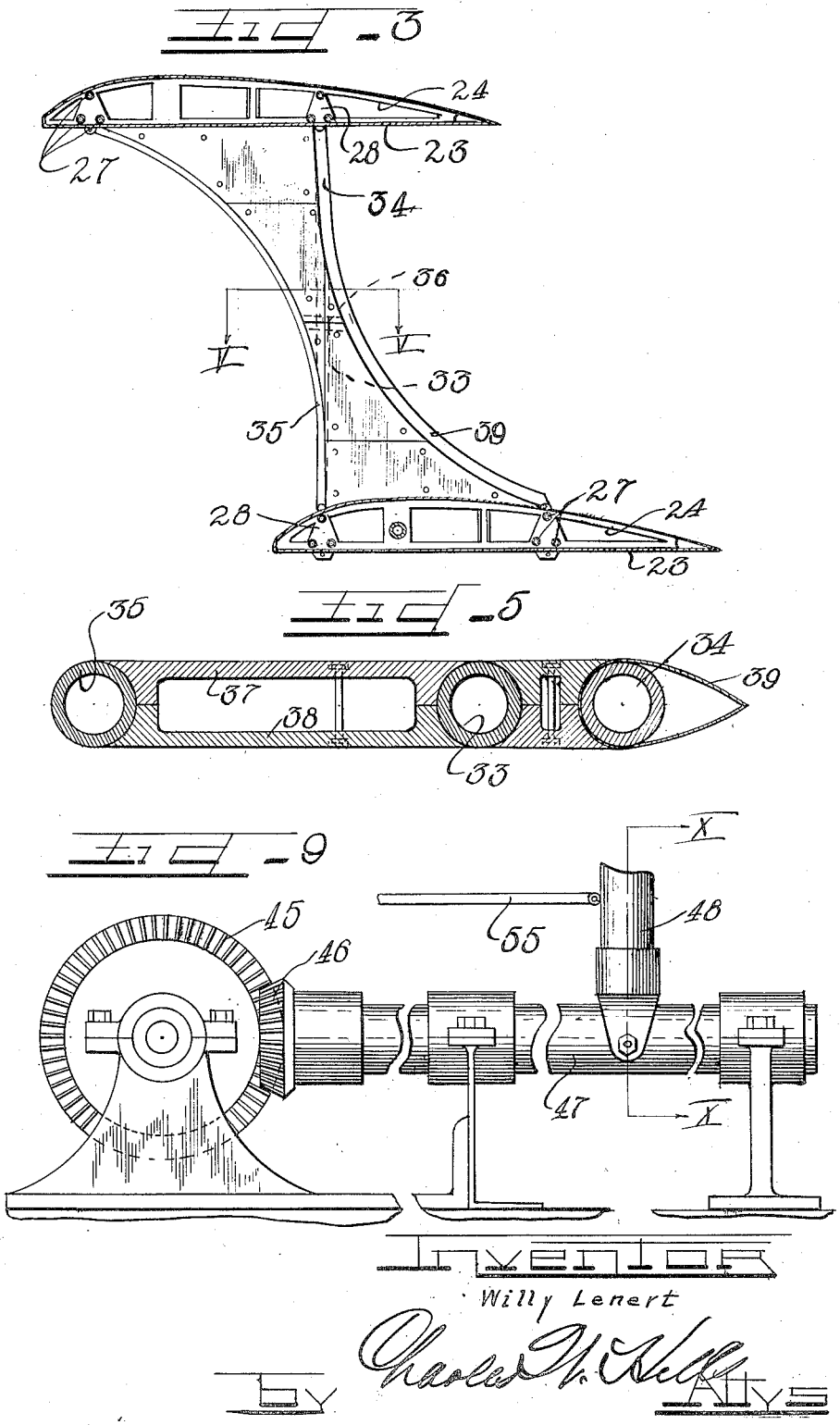

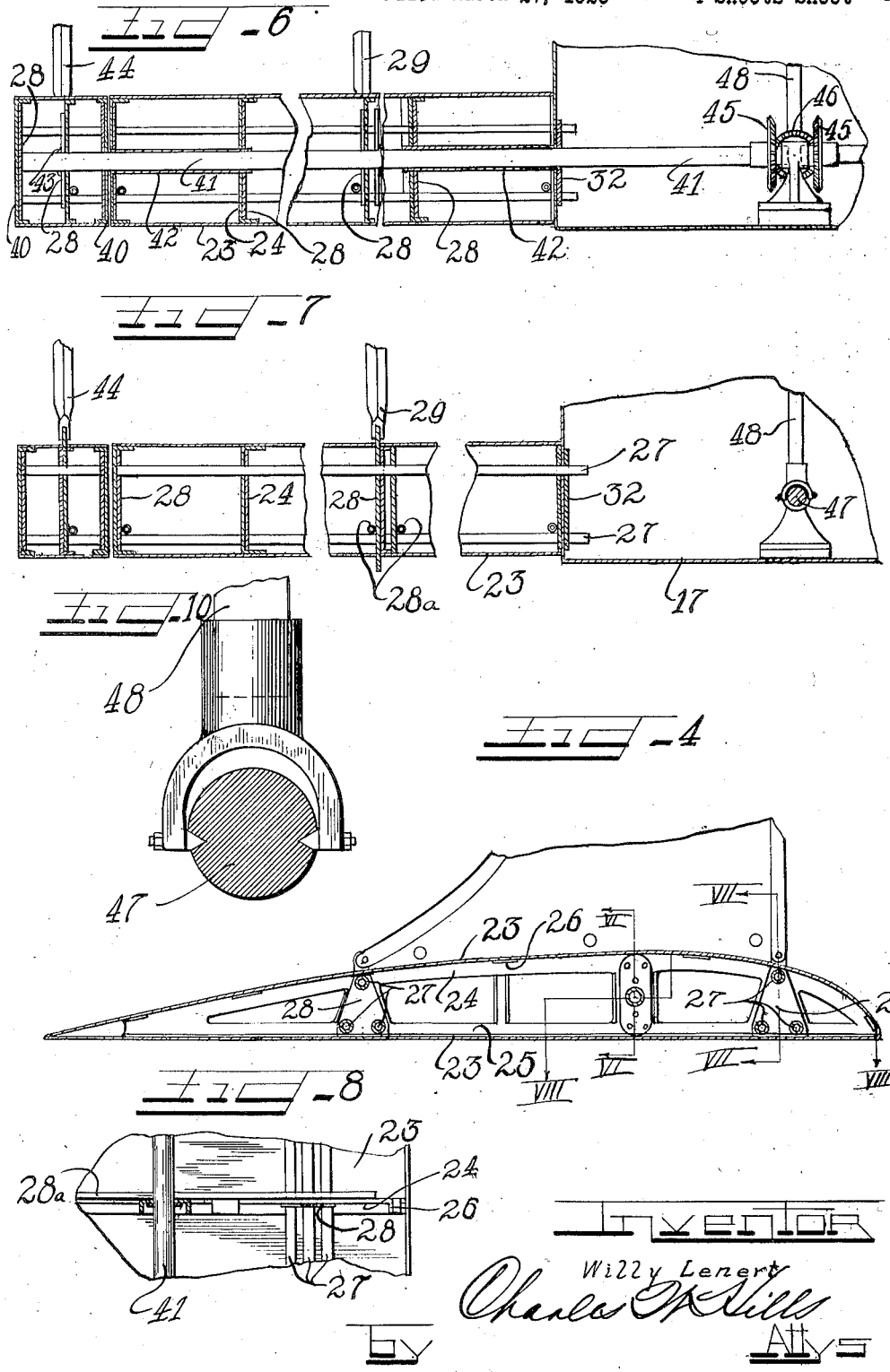

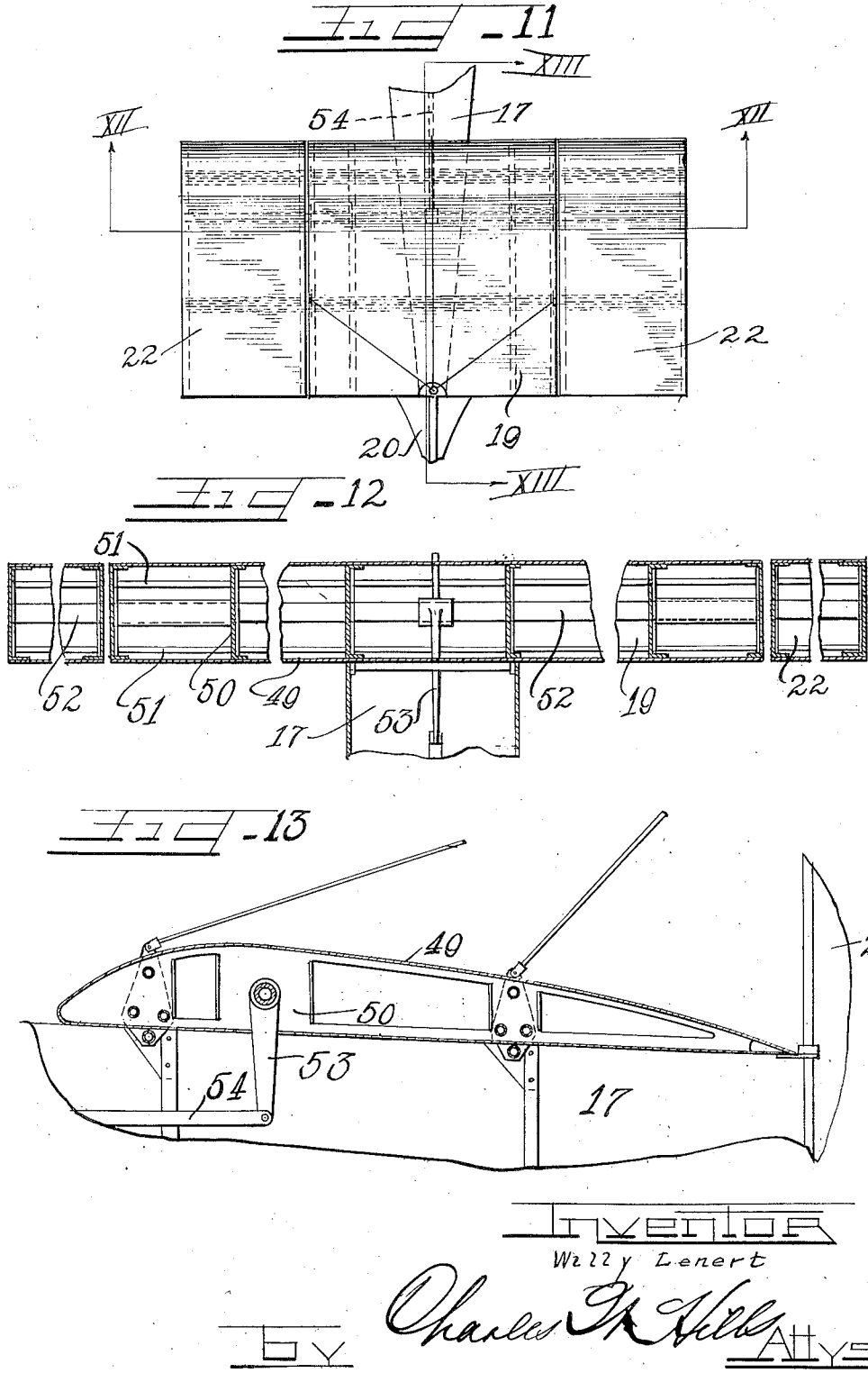

Patented Dec. 25, 1928.

1,696,493

UNITED STATES PATENT OFFICE.

WILLY LENERT, OF CHICAGO, ILLINOIS.

AIRPLANE.

Application filed March 27, 1926. Serial No. 97,823.

This invention relates to airplanes and particularly to the wing and stabilizing surfaces and the controls therefor.

It is the object of this invention to provide an improved all metal wing and stabilizer structure for airplanes having a strength and weight ratio superior to wood and fabric wings together with simplicity of structure and permanency of form superior to the wood and fabric construction.

It is also an object of this invention to provide an improved metal wing structure requiring no drift bracing.

It is another object of this invention to provide a wing span built up of spacers and tubing providing a beam of maximum resistance to bending movement with minimum weight.

Another object of this invention is to provide an improved form of quickly adjustable means for attaching wing panels to the fuselage and center panel.

A further object of this invention is to provide an improved stream lined strut built up of tubing to resist both bending and compression stresses.

Still another object of this invention is to provide an improved operating control eliminating cables and pulleys comprising direct connections entirely within the fuselage and wings for operating the controls in either direction. Heretofore it has been necessary to use upstanding lever arms on the ailerons or wing flaps connected to the pilot controls by a complicated system of cables offering considerable parasitic resistance as well as requiring double cables to operate the flaps in either direction.

This invention comprises the novel structure and methods hereinafter described and more particularly pointed out and described in the appended claims.

As shown on the drawings:

Figure 1 is a front elevation of an airplane embodying one form of this invention.

Figure 2 is a side elevation thereof.

Figure 3 is an enlarged wing section showing one strut in elevation, taken on the line III—III of Figure 1.

Figure 4 is an enlarged lower wing section on the line IV—IV of Figure 1.

Figure 5 is an enlarged section of the strut on the line V—V of Figure 3.

Figure 6 is an enlarged section on the line VI—VI of Figure 4.

Figure 7 is an enlarged section on the line VII—VII of Figure 4.

Figure 8 is a fragmentary section on the line VIII—VIII of Figure 4.

Figure 9 is an enlarged fragmentary elevation of the control mechanism.

Figure 10 is a section on the line X—X of Figure 9, with parts in elevation.

Figure 11 is a plan view of the tail surfaces.

Figure 12 is an enlarged section on the line XII—XII of Figure 11.

Figure 13 is an enlarged section on the line XIII—XIII of Figure 11.

As shown on the drawings:

The general layout of the airplane chosen for illustration follows the conventional design of a tractor biplane, having upper and lower wings, 15 and 16, forming a single panel on either side of a fuselage 17, provided with landing gear 18, a stabilizer or tail surface 19 and a rudder 20. The ailerons 21 are formed as continuations of the wing tips and the elevators 22 likewise form continuations of the stabilizer surface.

Figures 3 and 4 illustrate the wing construction wherein the metal wing covering 23 is supported by a series of metal ribs 24 cut out for lightness between the spar positions. As shown, the ribs are provided with a continuous flange 25 for attachment to the underneath wing covering and either a continuous or intermittent flange 26 for attachment to the upper covering, the covering being spot welded or riveted to these flanges at suitable intervals. The wing spars each comprise three tubes 27 held in triangular relationship by steel plates 28 adjacent each rib, the tubes being brazed to each plate to form a girder structure resisting drift stresses as well as bending. A stiffening tube 28ª is brazed to the front and rear spar plates 28 at intervals to tie the spars together independently of the ribs. Preferably two of these tubes defining the base of the triangle are horizontally disposed near the bottom of the wing section to better provide for the normal stresses imposed thereon. It will be evident that the spacing and disposition of these tubes is proportioned to carry the designed wing loading, the spars being supported at their outer ends by struts 29 together with diagonal flying and landing wires 30 and 31 as in the customary biplane panel construction.

On the body end of each wing section the three tubes comprising each spar project slightly and slip into sockets 32 in the fuselage and center wing panel for the lower and upper wings respectively, the flying and landing wires serving to tie the wings securely to the fuselage.

The struts 29 are built around a straight tube 33 connecting the rear spar of the upper wing to the front spar of the lower wing, a curved tube 34 merging with the tube 33 and leading to the rear spar of the lower wing while a similar tube 35 leads from the tube 33 to the front spar of the upper wing, this tube structure being built up by brazing or welding, preferably with a short central horizontal stiffening bar 36 leading from the tube 35 to 33 and thence to 34, as shown in dotted lines on Figure 3. After this tube structure is built up it is stream lined by inserted filler pieces 37 and 38 bolted together at intervals; a stream lining tube 39 being added to the rear tube 34 to cut down eddy losses.

The ailerons 21 are of identical section and construction with the wings with the exception that the end ribs 40 are not cut away but form enclosures for the section. Tubes or shafts 41 are disposed longitudinally in both lower wings in a position slightly in advance of the normal center of pressure on the wing section. This tube is journaled at 42 in the various wing ribs and projects into the aileron and is secured thereto at 43, this tube thereby serving as the axis for the lower wing aileron. The upper aileron is similarly mounted on a short tube, not shown, and the two ailerons on each side are tied together by a strut 44 connecting the front spars of each aileron to operate them as a unit. The tubes 41 in each lower wing extend into the fuselage and terminate in bevel gears 45 located on either side of a shaft 47 extending back to the operators cockpit where a lever or stick 48 is pivoted thereto. It will be evident that with this structure a rocking or crosswise movement of the stick will rock the shaft 47 and rotate the two bevel gears in opposite directions thus elevating one pair of ailerons and depressing the other pair giving the necessary lateral or rolling control members within the wings and fuselage, entirely eliminating projecting lever arms and cable controls connected thereto. The tail surfaces comprise the previously mentioned stabilizer 19 and elevators 22 positioned on either side of the stabilizer. The construction of the stabilizer and elevators duplicates the wing and aileron construction previously described on a smaller scale, the covering being indicated by the numeral 49, the ribs by the numeral 50 and the spars by the numeral 51. The elevator control comprises a tube or shaft 52 journaled in the stabilizer ribs near the center of pressure and fixed to the elevator ribs to tilt them in unison, the shaft 52 carrying a lever 53 depending downwardly into the interior of the fuselage tail and connected by a rod or tube 54 to the stick or control 48 previously mentioned which is pivoted to the shaft 47 to permit fore and aft movement thereof. The elevator linkage is arranged to provide the standard control wherein pulling the stick back will tilt the elevators upwardly to produce a climb.

I am aware that many changes may be made and numerous details of construction may be varied through a wide range without departing from the principles of this invention and I therefore do not purpose limiting the patent granted hereon otherwise than necessitated by the prior art.

I claim as my invention:

1. Wing spars for an airplane comprising a plurality of tubes disposed in spaced relationship and members brazed thereto adapted to maintain said relationship and similar spacing members secured to the fuselage of the airplane and adapted to form sockets for receiving the ends of said tubes.

2. An airplane wing structure comprising flanged and apertured metal ribs, spaced tubular members forming front and rear spars and passing the aperture in said ribs, and traverse spacing members brazed to said tubes immediately adjacent the ribs, those spacing members adjacent the strut locations having projecting lugs for the attachment of said struts.

In testimony whereof I have hereunto subscribed my name.

WILLY LENERT.